March 25, 1941. H. J. FINDLEY 2,236,475
UNDER-SEAT AUTOMOBILE HEATER
Filed May 6, 1939 3 Sheets-Sheet 1

INVENTOR
HOWARD J. FINDLEY
BY
ATTORNEYS

March 25, 1941.  H. J. FINDLEY  2,236,475
UNDER-SEAT AUTOMOBILE HEATER
Filed May 6, 1939  3 Sheets-Sheet 3

INVENTOR
HOWARD J. FINDLEY
BY
Kwis Hudson & Kent
ATTORNEYS

Patented Mar. 25, 1941

2,236,475

UNITED STATES PATENT OFFICE 2,236,475

UNDER-SEAT AUTOMOBILE HEATER

Howard J. Findley, Euclid, Ohio, assignor to Eaton Manufacturing Company, Cleveland, Ohio, a corporation of Ohio Application May 6, 1939, Serial No. 272,172

3 Claims. (Cl. 257—137)

This invention relates to automobile heaters and one of its objects is to provide an improved construction and arrangement for this kind of heater whereby the space available for installation of the heater in the automobile is used to better advantage and a more satisfactory distribution of the heated air is obtained.

Another object of my invention is to provide an automobile heater of a novel form of construction such that it can be installed under the seat and in a position to supply heated air directly to the front and rear compartments of the automobile.

Still another object of my invention is to provide an improved construction for an automobile heater in which heat-exchange cores of different size or heating capacity are arranged so that streams of heated air of different volumes or heat content can be directed to different portions of the automobile compartment.

Yet another object of my invention is to provide an improved construction for an automobile heater of the under-seat type in which one pair of side walls of the heater casing are provided with large and small openings for delivering streams of heated air directly to the front and rear compartments, and heat-exchange cores of large and small size or heating capacity are disposed adjacent such large and small discharge openings, respectively.

A further object of my invention is to provide an automobile heater of novel construction in which spaced walls of the heater casing have discharge openings for the heated air are disposed in non-parallel relation, so that the streams of heated air will move both longitudinally and transversely of the compartments or spaces into which they are directed and a better heat-distribution will thus be obtained.

My invention may be further briefly summarized as consisting in certain novel combinations and arrangements of parts hereinafter described and particularly set out in the appended claims.

In the accompanying sheets of drawings.

Figure 1:
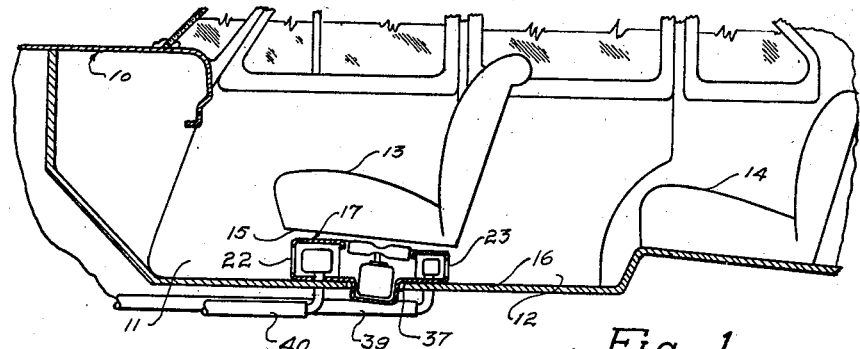
Fig. 1 is a partial longitudinal sectional view taken through the body of an automobile having front and rear compartments and showing a heater of my improved construction located between the compartments and under the front seat.

In the accompanying drawings, to which more detailed reference will presently be made, I have shown improved constructions for automobile heaters and particularly for automobile heaters of the under-seat type. Although in describing my improved constructions detailed reference will be made to the specific forms of heaters shown in the drawings, it will be understood, of course, that the invention is not limited to the particular heaters and heater arrangements herein disclosed, but includes various other constructions and arrangements coming within the scope of the appended claims.

In Fig. 1 of the drawings I show an automobile 10 having front and rear compartments 11 and 12 and front and rear seats 13 and 14 which may be fabric covered or upholstered, the front seat being disposed between the compartments and with the bottom 15 thereof spaced above the floor 16 as is usual in present day automobile construction. As is well known to persons skilled in this art, considerable difficulty has heretofore been experienced in getting a satisfactory distribution of heated air to both the front and rear compartments of an automobile having this general arrangement. I overcome this difficulty, as will be explained more in detail hereinafter, by providing a heater 17 of the under-seat type and locating the same beneath the front seat 13 so as to deliver heated air in two separate streams directly to the front and rear compartments.

The heater 17 may comprise a casing or shell 18 having heat-exchange cores 19 and 20 therein and an air-impelling means 21 for causing air to be heated to flow through the cores and to be delivered in separate streams directly to the front and rear compartments through the spaced discharge openings 22 and 23. The casing 18 may be a hollow sheet metal structure formed of one or more parts and of generally quadrangular shape. As here shown the casing may comprise top and bottom walls 24 and 25, a pair of spaced side walls 26, and a pair of spaced end walls 27 and 28.

It is usually desirable to supply a larger amount of heat, or volume of heated air, to the front compartment of an automobile than to the rear compartment and, as will be presently seen, the novel form and construction of my heater provides this desired relative distribution and also enables the heater to be readily installed under the front seat. There are various reasons for providing this relative distribution of heated air, among which is the fact that the forward motion of the automobile usually causes cold air to enter the front compartment more readily than it does the rear compartment. Another reason for initially supplying a larger volume of heated air to the front compartment is that the warm air usually gravitates from the front compartment to the rear compartment by reason of the forward travel of the vehicle, thus lessening the volume of heated air which need be supplied to the rear compartment for maintaining a comfortable temperature. Moreover, the front compartment, being the driving compartment, is more frequently occupied than the rear compartment, and this provides a further reason for supplying a larger volume of heated air to the front compartment.

Figure 2:
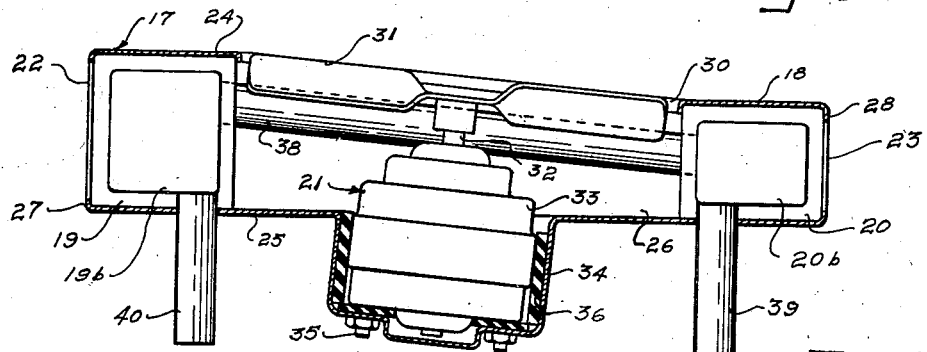
Fig. 2 is a longitudinal sectional view taken through the under-seat heater of Fig. 1 but showing the same on a somewhat larger scale.

In order that my heater 17 may be capable of supplying this desired larger volume of heated air to the front compartment, and may better utilize the space available beneath the front seat 13, I construct the casing and heat-exchange cores of my heater so that streams of heated air of the desired relative size or heat content will be supplied to the front and rear compartments. To this end I construct the casing 18 with the end wall 27 thereof, which is nearest the front compartment, relatively higher than the rear end wall 28 and make the discharge openings 22 and 23 of these end walls of corresponding relatively large and small height or size. The top wall 24 of the casing or shell of the heater may slope downwardly as shown in Figs. 1 and 2. I also construct the heat-exchange cores 19 and 20 of large and small size, or heat-exchange capacity, and arrange them in spaced relation in the casing 18 with the larger core 19 adjacent the larger discharge opening 22 and the smaller core 20 adjacent the smaller discharge opening 23. With the relative arrangement and sizes for the heat-exchange cores and discharge openings, as just described, it will be seen that separate streams of heated air will be delivered directly into the front and rear compartments and that a greater amount of heat or larger volume of heated air can be supplied to the front compartment than to the rear.

Air to be heated may be drawn into or supplied to the casing 18 at one or more points. In this instance I show the top wall 24 provided with an intake opening 30 located between the heat-exchange cores 19 and 20 and in which the fan 31 of the air-impelling means 21 operates for drawing air into the casing and discharging the same in two separate streams through the cores 19 and 20 and the discharge openings 22 and 23 adjacent thereto. The fan 31 may be mounted directly on the shaft 32 of an electric motor 33. This motor may be suitably supported on the casing 18 at a point between the cores 19 and 20 and, in this instance, I show the bottom wall 25 having a pocket-like projection 34 providing a recess into which the motor extends. The motor may be secured in this recess by suitable bolts 35, and, if desired, sound and vibration absorbing cushions 36 formed of sponge rubber or other appropriate material may be interposed between the housing of the motor and the walls of the recess.

When the heater 17 is installed in the automobile under the front seat 13 its bottom wall 25, which is substantially flat except for the motor support 34, may rest directly on the floor 16 of the automobile. When the heater is located in this relative position the top wall 24 of the casing will extend in adjacent relation to the bottom 15 or underside of the front seat 13. The distance at which the bottom of the seat is spaced above the floor 16 may vary in different makes of automobiles and hence the space between the top wall 24 of the heater casing and the bottom of the seat may also vary. In some instances the top wall 24 may be in contact with the underside of the seat, in which case the air to be heated passes through the cloth or fabric covering the front seat 13 before being drawn into the heater casing by the fan 31. In other cases the top wall 24 of the heater casing may be spaced from the underside of the seat, in which case some or all of the air to be heated flows to the intake opening through this space and the remainder, if any, passes through the cloth or fabric covering of the seat.

It will be seen that my heater 17 can be easily installed in an automobile because only one large hole 37 need be cut in the floor, or the floor provided with a depression, to accommodate the projection 34 in which the electric motor 33 is mounted. Since access can be readily had to the compartment floor at the point where this hole is to be cut, the cutting can be done by means of a hole saw, and hence laborious and costly installation operations can be avoided.

The heat-exchange cores 19 and 20 may be of the usual type of construction, that is to say, they may be finned tube structures having numerous passages for the air to be heated and having end tanks thereon. The tanks of the core 19 are designated 19a and 19b and the tanks of the core 20 are designated 20a and 20b.

Heating medium such as hot water taken from the engine cooling system may be circulated through the heat-exchange cores 19 and 20 for supplying heat to the air which is forced through the cores by the fan 31. Although the heating medium can be supplied to both cores simultaneously, that is to say in parallel relation to each other, I prefer to circulate the medium through the cores in series with each other and with the hotter medium passing first through the smaller core 20 and then through the larger core 19. This desired series circulation of the heating medium may be obtained by connecting the tanks 19a and 20a of the cores 19 and 20 by the pipe 38 and by connecting supply and return pipes 39 and 40, respectively, with the tanks 20b and 19b of the cores 20 and 19. This series circulation of heating medium through the cores 20 and 19 may be desirable because it causes the hotter medium to be supplied to the core having the smaller heat drop, in this instance the core 20 which heats the stream of air to be supplied to the rear compartment. In this way only a portion of the heat of the supplied medium will be removed in the core 20 for delivery to the rear compartment, and thus the temperature and heat-content of the medium will still be relatively high when it is supplied to the core 19 for heating the stream of air being delivered into the front compartment.

As another feature of my invention I may provide for a proportioning or variation in the amount or volume of air to be passed through the heat-exchange cores 19 and 20. I may accomplish this by arranging the air-impelling means with the axis of rotation of the fan in a relatively inclined position so that the fan will favor one heat-exchange core over the other. In Fig. 2 I show the air-impelling means 21 mounted with its axis or plane of rotation relatively inclined or sloping toward the heat-exchange core 19 so that the fan 31 will favor this particular core, in this instance the larger core, and will tend to cause a larger volume of air to pass through this heat-exchange core than would pass through the core if the axis of rotation of the impelling means were vertical or normal to the plane of the bottom wall 25. In the arrangement shown in Fig. 2 in which the fan 31 rotates in or adjacent the intake opening 30 of the top wall 24, the impelling means is disposed with its axis of rotation substantially normal to the plane of such top wall.

Figure 4:
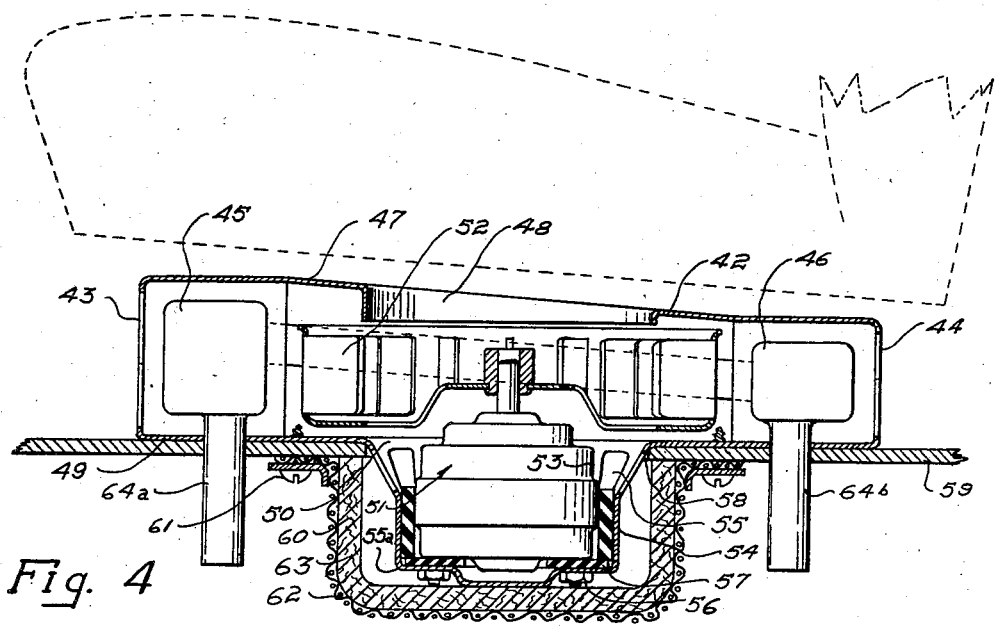
Fig. 4 is a similar longitudinal sectional view taken through a modified form of my under-seat heater.
Figure 5:
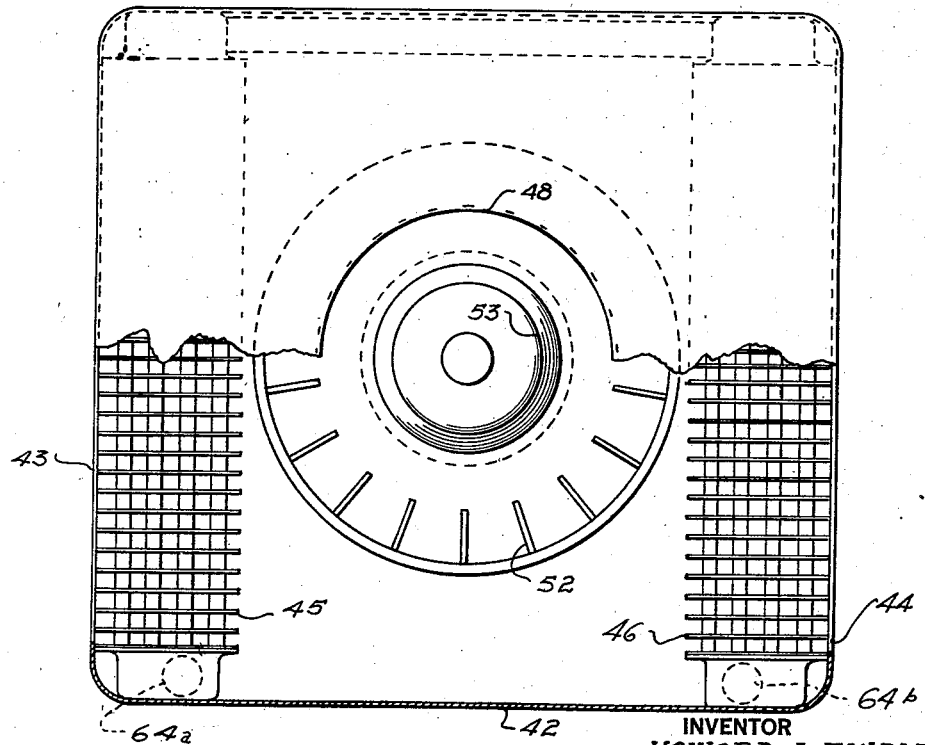
Fig. 5 is a plan view thereof with portions broken away.

In Figs. 4 and 5 of the drawings I show a modified form of my heater, in which I make provision for introducing fresh air into the casing as well as recirculated air. As shown in Figs. 4 and 5 this modified form of my heater may comprise a casing or shell 42 of quadrangular shape having large and small discharge openings 43 and 44 in its end walls, and heat-exchange cores 45 and 46 of corresponding large and small size or capacity located adjacent such openings. The sloping top wall 47 of the casing has an intake opening 48 therein through which recirculated air may enter the casing from the interior of the automobile. The bottom wall 49 may have an opening 50 substantially opposite the intake opening 48 through which fresh air may be admitted to the casing from outside the vehicle.

This modified form of my heater also includes an air impelling means 51 located between the cores 45 and 46, and which may comprise a centrifugal blower 52 and an electric motor 53 connected with the blower and suitably supported on the casing 42. The motor 53 may extend part way out of the casing 42 through the fresh air intake opening 50 and may be supported in a cup-like projection 54 which is connected with the bottom wall of the casing by means of spaced arms or straps 55. The motor 53 may be connected with the support 54 by means of suitable bolts 56 and, if desired, sound and vibration absorbing means in the form of cushions 57 of sponge rubber or other suitable material may be disposed between the housing of the motor and the walls of the support.

In installing this heater in the vehicle beneath the front seat in the position of the heater shown in Fig. 1, a hole 58 is cut in the floor 59 of the vehicle compartment to accommodate the motor support 54 and also to permit fresh air to be drawn in through the intake opening 50 from outside the vehicle. The arms or straps 55 which connect the motor support 54 with the bottom wall 49 may form a hub-like portion 55a adapted to extend into and substantially fit the floor opening 58.

To prevent dust or other foreign material from being carried into the automobile by the stream of fresh air, I may provide a filter 60 which extends over or across the intake opening 50. In this instance the filter 60 is of cup-like form surrounding the motor support and connected with the underside of the floor 59 by screws 61. The filter may be of any appropriate construction and may comprise an outer basket or cage 62 formed of wire screen and a layer of felt or other suitable fibrous filtering material 63 therein.

In the operation of this form of my heater, recirculated air will be drawn into the casing through the intake opening 48 and at the same time fresh air from outside the vehicle will be drawn in through the filter 60 and the intake opening 50. The recirculated and fresh air will become mixed in the heater housing and will be discharged in streams through the cores 45 and 46 to the front and rear compartments of the automobile. Heating medium, such as hot water from the engine cooling system may be circulated through the cores 45 and 46 by means of the pipe connections 64a and 64b.

Figure 6:
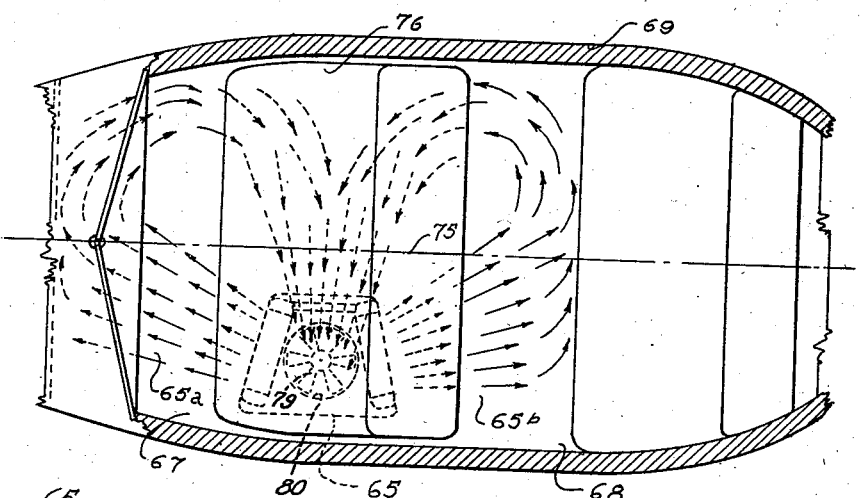
Fig. 6 is a sectional plan view taken through an automobile having front and rear compartments and showing another form of my heater installed under the front seat.
Figures 7, 8:
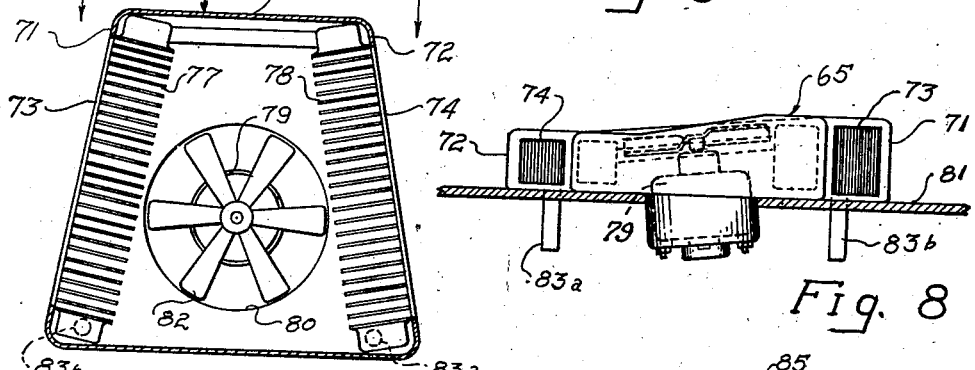
Fig. 7 is a sectional plan view taken through the heater of Fig. 6 and showing the same on a larger scale.
Fig. 8 is a side elevation of the same heater viewed as indicated by line 8—8 of Fig. 7, with portions broken away.

In Figs. 6, 7 and 8 I show another form of my heater, designated 65, which is constructed and arranged so as to secure a more efficient and satisfactory distribution of the heated air in the compartments of an automobile. By the use of this modified form of my heater I cause streams 65a and 65b of heated air to be delivered into the front and rear compartments 67 and 68 of the automobile 69 in a manner such that the heated air moves transversely as well as longitudinally of the compartments. To secure this desired distribution of the heated air I construct the casing 70 of my heater with the end walls 71 and 72, which have the discharge openings 73 and 74 therein, in non-parallel relation so that the streams 65a and 65b will be directed outwardly in angular relation to each other instead of in exactly opposite directions. In other words, the quadrangular casing of this heater is of substantially trapezoidal form, as shown in Figs. 6 and 7. In securing this desired distribution of the heated air I also locate the heater 65 to one side of the longitudinal center line 75 of the vehicle and beneath the front seat 76, that is to say at a non-central point intermediate the ends of the vehicle compartment. This non-central location of the heater, in conjunction with the relatively inclined relation of the end walls containing the discharge openings 73 and 74, results in the streams 65a and 65b of heated air being delivered into the front and rear compartments so as to move both longitudinally and transversely thereof as indicated in Fig. 6. An efficient distribution of the heated air will thus be obtained in the automobile whereby the entire floor area of both the front and rear compartments can be maintained at a comfortable temperature.

The angular or non-parallel relation of the end walls 71 and 72 of the heater 65 and the location point of the heater in the vehicle, that is to say the factors by which I secure the desired directional flow of the air streams 65a and 65b, may be varied considerably in obtaining the best results. Thus, the end walls may be disposed such that their extended planes would intersect each other with an acute included angle having any value from 10 to 30 degrees. In the construction here shown the included angle of intersection for the end walls 71 and 72 is in the neighborhood of 20 or 22 degrees. Likewise the location of the heater in the automobile may be shifted more or less from the position shown in Fig. 6 in which the heater is located between the ends of the vehicle compartment and adjacent one side edge thereof.

Figure 3:
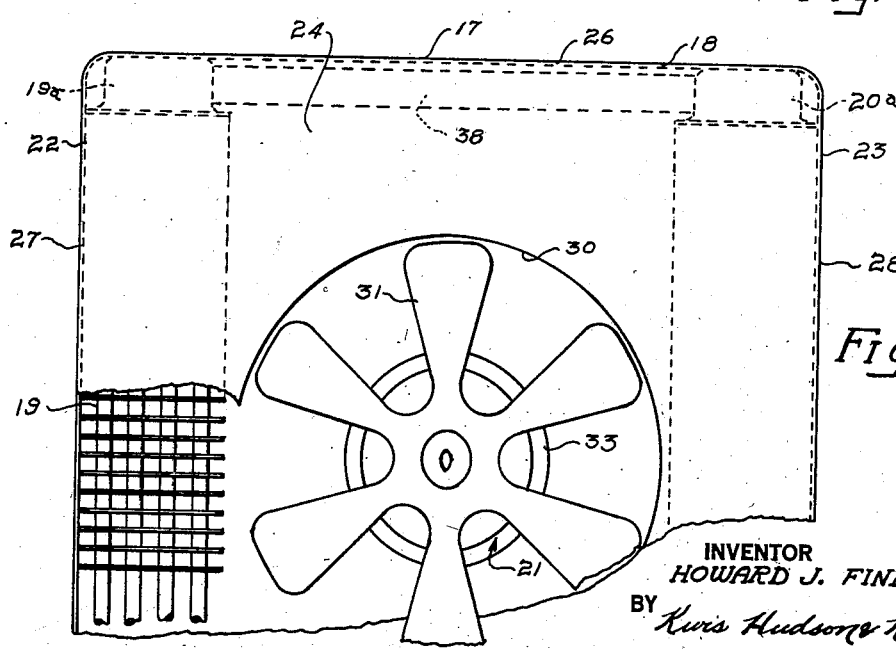
Fig. 3 is a top plan view of the heater with portions thereof broken away.

Aside from the feature of the angularly disposed end walls 71 and 72, as just described, the heater 65 may be generally similar in construction to the heaters shown in Figs. 2 and 4, that is to say this heater may have heat-exchange cores 77 and 78 located adjacent the discharge openings 73 and 74, respectively, and may also include an air-impelling means 79 for causing a flow of air into the heater casing and the delivery of the streams of heated air through the cores and discharge openings. As in the case of the heaters above described, the heater 65 may be constructed with the discharge openings 73 and 74 of relatively large and small size, and with the corresponding adjacent cores 77 and 78 of corresponding large and small size or capacity. The casing 70 of this heater may have an intake opening 80 in the top wall thereof which provides a passage through which air may be drawn in by the propeller fan 82 of the impelling means 79. In this modified heater, as in the case of the heater shown in Figs. 1 to 3 and above described, the axis or plane of rotation of the air-impelling means 79 slopes toward the larger capacity core 77 and will cause a larger volume of air to be delivered through this core than is delivered through the core 78.

Hot water, or other suitable heating medium, may be circulated through the heat-exchange cores 77 and 78 by piping which includes the connections 83a and 83b. In this instance the circulation is a series circulation with the hotter medium being supplied first to the smaller core 74 although any other suitable supply or piping arrangement could be used.

Figure 9:
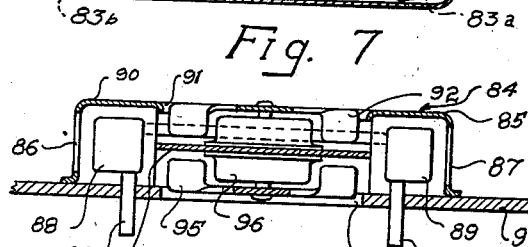
Fig. 9 is a longitudinal sectional view taken through another modified form of my under-seat automobile heater.
Figure 10:
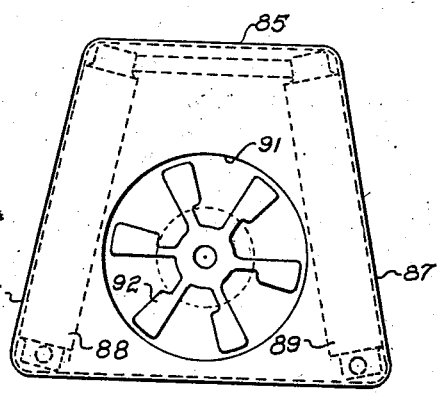
Fig. 10 is a top plan view of the heater of Fig. 9.

In Figs. 9 and 10 I show an automobile heater 84 constituting still another embodiment of my invention. This heater comprises a quadrangular casing 85 having discharge openings 86 and 87 in the end walls thereof and heat-exchange cores 88 and 89 located adjacent these openings. The top wall 90 of the casing has an intake opening 91 therein through which recirculated air from the vehicle compartment can be drawn into the casing by the fan 92. The bottom wall of the heater casing, which may comprise a portion of the floor 93 of the vehicle compartment, may have an opening 94 therein through which fresh air from outside the vehicle can be drawn in by the fan 95.

The fans 92 and 95 may be driven by a common motor 96 and may be mounted on opposite ends of the armature shaft thereof. These fans are preferably constructed with the blades thereof deflected to an angle or position which will cause air to be drawn in through the intake openings when the fans are rotated and to be discharged substantially radially or circumferentially of the fans and thereby forced through the heat-exchange cores 88 and 89. To prevent interference between the fans and the air streams delivered thereby I may provide a baffle or partition plate 97 which preferably extends from one heat-exchange core to the other and from one side wall of the casing to the other. This baffle thus divides the interior of the casing into upper and lower chambers in which the fans 92 and 95 operate, respectively, and causes the air streams delivered by the fans to pass through the corresponding upper and lower sections of the heat-exchange cores. This baffle plate may also form a support for the motor 96 and may have an opening therein through which the housing of the motor extends.

Heating medium, such as hot water, may be supplied to the heat-exchange cores 88 and 89 by means of piping which includes the connections 98 and 99.

From the foregoing description and accompanying drawings it will now be readily seen that I have provided an improved construction and arrangement for an automobile heater whereby a more direct, efficient and satisfactory distribution of heated air to the various portions or compartments of the vehicle may be obtained. It will be seen further that my novel construction may be embodied in a heater of the under-seat type and, when so used, a desired proportioning of the volume of heated air to be supplied to the front and rear compartments can be readily obtained. Moreover, it will be seen that by constructing the heater with the discharge openings thereof in relatively inclined or non-parallel planes and locating the heater at a non-central point, such as to one side of the longitudinal center line of the vehicle, a desired directional flow of the streams of heated air can be obtained in which such streams will move both longitudinally and transversely of the vehicle compartments being heated. It will also be seen that by supplying the heating medium to the heat-exchange cores of my heater in series and so that the hotter medium will be supplied first to the core or core section having the smaller heat-drop, I am able to secure a more satisfactory balance or proportioning of the heat being supplied to the front and rear compartments.

While I have illustrated and described my improved construction and arrangement for automobile heaters in a somewhat detailed manner it will be understood, of course, that I do not wish to be limited to the precise constructions and arrangements herein disclosed, but regard my invention as including such changes and modifications as do not constitute a departure from the spirit of the invention and the scope of the appended claims.

Having thus described my invention I claim:

1. An automobile heater comprising a casing provided with an air inlet opening and a pair of spaced air delivery openings, spaced heat-exchange cores of different heating capacities disposed adjacent said delivery openings, and rotary air-impelling means between said cores and operable about an axis which is inclined so that the plane of rotation of said air-impelling means slopes toward the core of larger capacity for causing air to be drawn in through said inlet opening and discharged through the cores in two streams with the larger stream passing through the core of larger heating capacity.

2. An under-seat heater for an automobile having front and rear compartments, comprising a casing having a sloping top wall provided with an air inlet opening and high and low end walls provided with openings for discharging air to said compartments, heat exchange cores of large and small heating capacities disposed adjacent said high and low walls respectively, and air-impelling means between said cores and operable to cause air to be drawn in through said inlet opening and discharged through the cores in two streams with the larger stream passing through the larger capacity core, said impelling means being operable about an axis extending substantially normal to said sloping wall and including a propeller fan rotatable in said inlet opening.

3. A heater for use in an automobile compartment at a point intermediate the ends of such compartment and to one side of the longitudinal center-line thereof, comprising a casing having an air intake opening and longitudinally spaced end walls provided respectively with relatively large and relatively small air discharge openings, heat-exchange cores of relatively large and relatively small size or capacity disposed adjacent said large and small openings respectively, a rotary air-impelling means operable to cause air to enter said intake opening and to deliver streams of heated air through said cores and discharge openings directly into said compartment, said end walls being non-parallel and disposed so that the planes thereof extend in a direction transversely of said compartment and, if produced, would intersect with an acute included angle such that said discharge openings will direct said streams of heated air both longitudinally and transversely of the compartment to thereby facilitate the distribution and circulation of heated air in the compartment, said rotary air-impelling means being operable about an axis which is inclined so that the plane of rotation of said rotary air-impelling means slopes toward the core of larger capacity.

HOWARD J. FINDLEY.